(12) United States Patent
Abotabl et al.

(10) Patent No.: US 11,974,309 B2
(45) Date of Patent: Apr. 30, 2024

(54) DOWNLINK CONTROL INFORMATION FOR FREQUENCY DOMAIN SLOT FORMAT INDICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Wanshi Chen, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/302,950

(22) Filed: May 17, 2021

(65) Prior Publication Data
US 2021/0400673 A1 Dec. 23, 2021

Related U.S. Application Data

(60) Provisional application No. 63/040,814, filed on Jun. 18, 2020.

(51) Int. Cl.
| | | |
|---|---|---|
| *H04W 72/53* | (2023.01) | |
| *H04L 5/14* | (2006.01) | |
| *H04W 72/0446* | (2023.01) | |
| *H04W 72/0453* | (2023.01) | |
| *H04W 72/23* | (2023.01) | |

(52) U.S. Cl.
CPC .............. *H04W 72/53* (2023.01); *H04L 5/14* (2013.01); *H04W 72/0446* (2013.01); *H04W 72/0453* (2013.01); *H04W 72/23* (2023.01)

(58) Field of Classification Search
CPC ............ H04L 5/16; H04L 5/14; H04W 72/53; H04W 72/0446; H04W 72/0453; H04W 72/23
See application file for complete search history.

(56) References Cited

U.S. PATENT DOCUMENTS

| | | | |
|---|---|---|---|
| 2014/0029490 A1* | 1/2014 | Kim | ...................... H04L 5/1469 370/280 |
| 2017/0264419 A1* | 9/2017 | Fakoorian | .................. H04L 5/14 |
| 2018/0198594 A1* | 7/2018 | Tiirola | .................. H04L 5/0051 |
| 2020/0045696 A1* | 2/2020 | Huang | ...................... H04L 5/10 |

(Continued)

FOREIGN PATENT DOCUMENTS

| | | |
|---|---|---|
| EP | 3668211 A1 | 6/2020 |
| EP | 3737137 A1 | 11/2020 |
| WO | WO-2019170151 A1 | 9/2019 |

OTHER PUBLICATIONS

International Search Report and Written Opinion—PCT/US2021/070574—ISA/EPO—dated Sep. 10, 2021.

*Primary Examiner* — Jael M Ulysse
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive, from a base station, downlink control information that includes a plurality of frequency domain slot format indications (SFIs), and communicate with the base station based at least in part on a frequency domain SFI of the plurality of frequency domain SFIs. Numerous other aspects are provided.

30 Claims, 9 Drawing Sheets

(56) References Cited

U.S. PATENT DOCUMENTS

| | | | |
|---|---|---|---|
| 2020/0092861 A1* | 3/2020 | Xu | H04W 74/002 |
| 2020/0305183 A1* | 9/2020 | Papasakellariou | H04W 52/146 |
| 2020/0337039 A1* | 10/2020 | Takeda | H04W 72/23 |
| 2020/0351847 A1* | 11/2020 | Kim | H04L 5/0094 |
| 2020/0374807 A1* | 11/2020 | Zhang | H04W 52/146 |
| 2020/0404646 A1* | 12/2020 | Zhang | H04W 72/0446 |
| 2021/0067992 A1* | 3/2021 | Kusashima | H04W 24/08 |
| 2022/0029761 A1* | 1/2022 | Su | H04L 27/2613 |
| 2022/0116150 A1* | 4/2022 | Kim | H04L 1/1812 |
| 2022/0200777 A1* | 6/2022 | Lee | H04W 72/0453 |

* cited by examiner

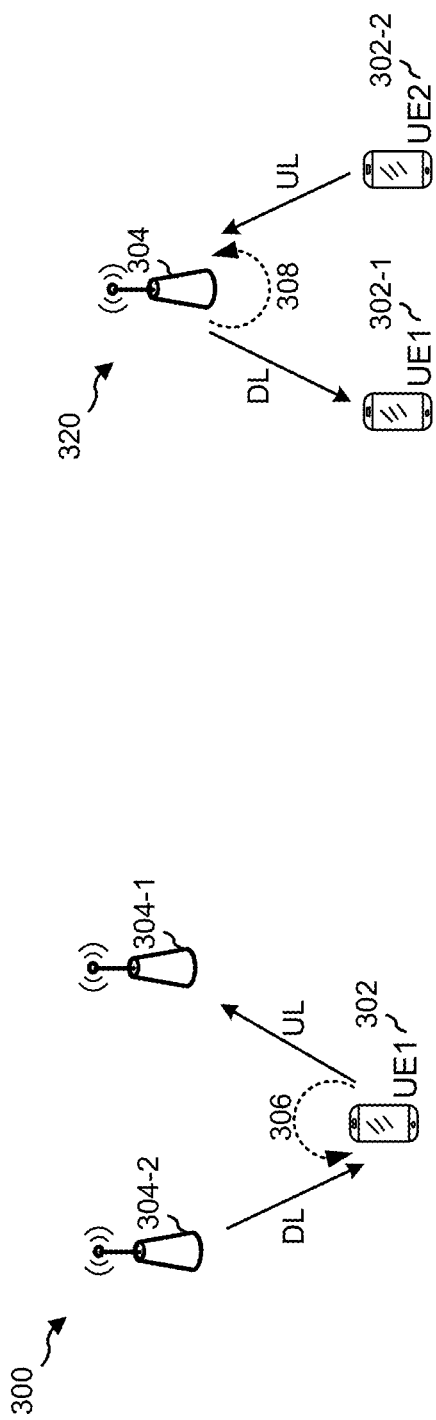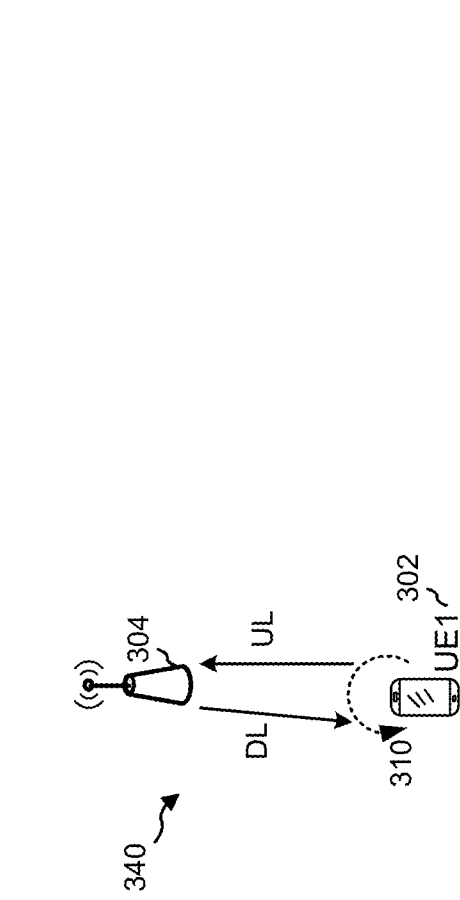

TDD (Half Duplex)

FDD

Full Duplex (in-band full duplex)

DL
UL

DOWNLINK CONTROL INFORMATION FOR FREQUENCY DOMAIN SLOT FORMAT INDICATION

CROSS-REFERENCE TO RELATED APPLICATION

This Patent Application claims priority to U.S. Provisional Patent Application No. 63/040,814, filed on Jun. 18, 2020, entitled "DOWNLINK CONTROL INFORMATION FOR FREQUENCY DOMAIN SLOT FORMAT INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink control information (DCI) for frequency domain slot format indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, downlink control information (DCI) that includes a plurality of frequency domain slot format indications (SFIs); and communicating with the base station based at least in part on a frequency domain SFI of the plurality of frequency domain SFIs.

In some aspects, a method of wireless communication, performed by a base station, may include transmitting, to a UE, DCI that includes a plurality of frequency domain SFIs; and communicating with the UE based at least in part on a frequency domain SFI of the plurality of frequency domain SFIs.

In some aspects, a non-transitory computer-readable medium may store one or more instructions for wireless communication. The one or more instructions, when executed by one or more processors of a UE, may cause the one or more processors to receive, from a base station, DCI that includes a plurality of frequency domain SFIs; and communicate with the base station based at least in part on a frequency domain SFI of the plurality of frequency domain SFIs.

In some aspects, a non-transitory computer-readable medium may store one or more instructions for wireless communication. The one or more instructions, when executed by one or more processors of a base station, may cause the one or more processors to transmit, to a UE, DCI that includes a plurality of frequency domain SFIs; and communicate with the UE based at least in part on a frequency domain SFI of the plurality of frequency domain SFIs.

In some aspects, a UE for wireless communication may include a memory, a transceiver, and one or more processors coupled to the memory. The memory and the one or more processors may be configured to receive, from a base station, via the transceiver, DCI that includes a plurality of frequency domain SFIs; and communicate, via the transceiver, with the base station based at least in part on a frequency domain SFI of the plurality of frequency domain SFIs.

In some aspects, a base station for wireless communication may include a memory, a transceiver, and one or more processors coupled to the memory. The memory and the one or more processors may be configured to transmit, to a UE, via the transceiver, DCI that includes a plurality of frequency domain SFIs; and communicate, via the transceiver, with the UE based at least in part on a frequency domain SFI of the plurality of frequency domain SFIs.

In some aspects, an apparatus for wireless communication may include means for receiving, from a base station, DCI that includes a plurality of frequency domain SFIs; and means for communicating with the base station based at least in part on a frequency domain SFI of the plurality of frequency domain SFIs.

In some aspects, an apparatus for wireless communication may include means for transmitting, to a UE, DCI that includes a plurality of frequency domain SFIs; and means for communicating with the UE based at least in part on a frequency domain SFI of the plurality of frequency domain SFIs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
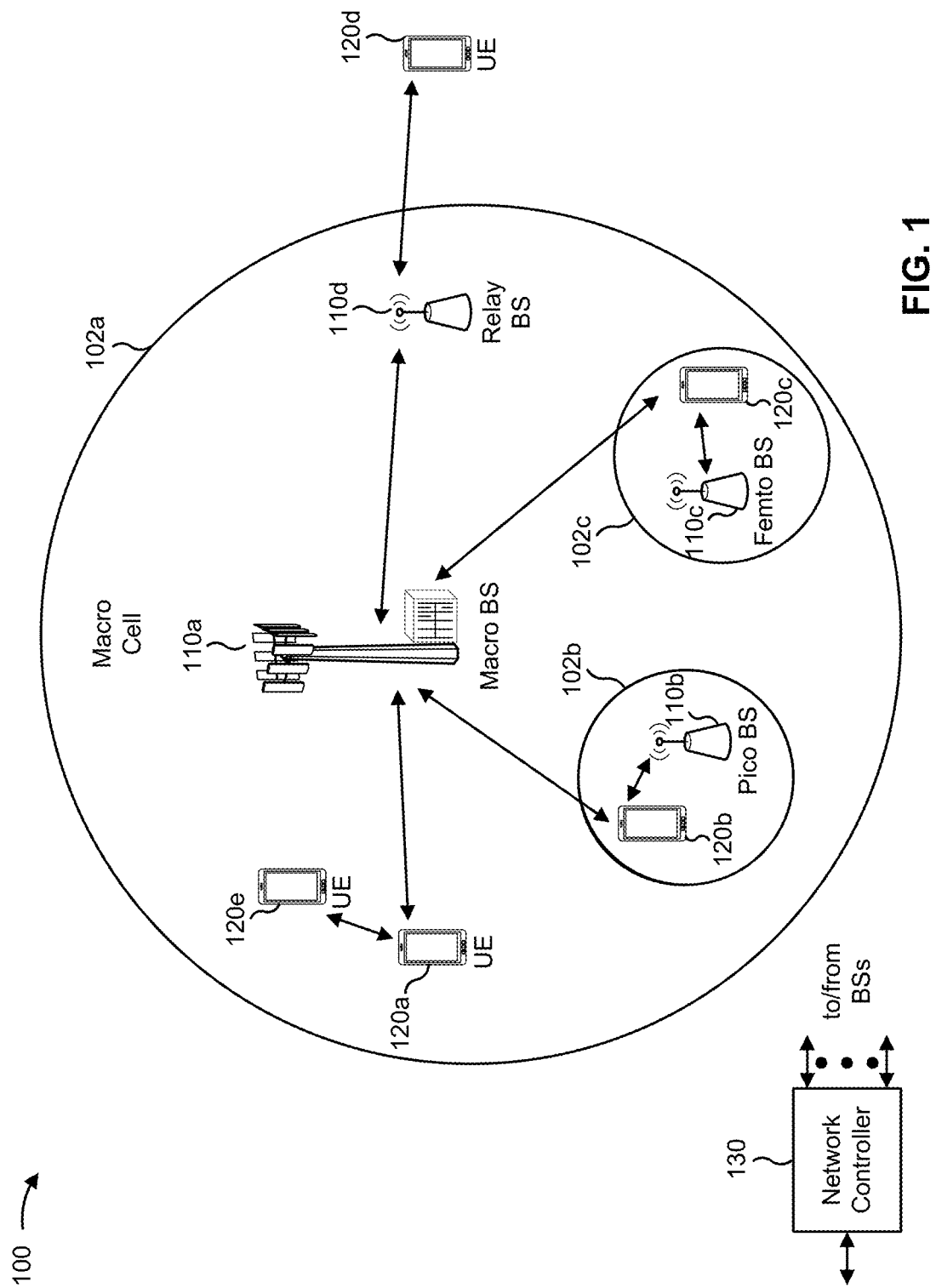
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 12d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
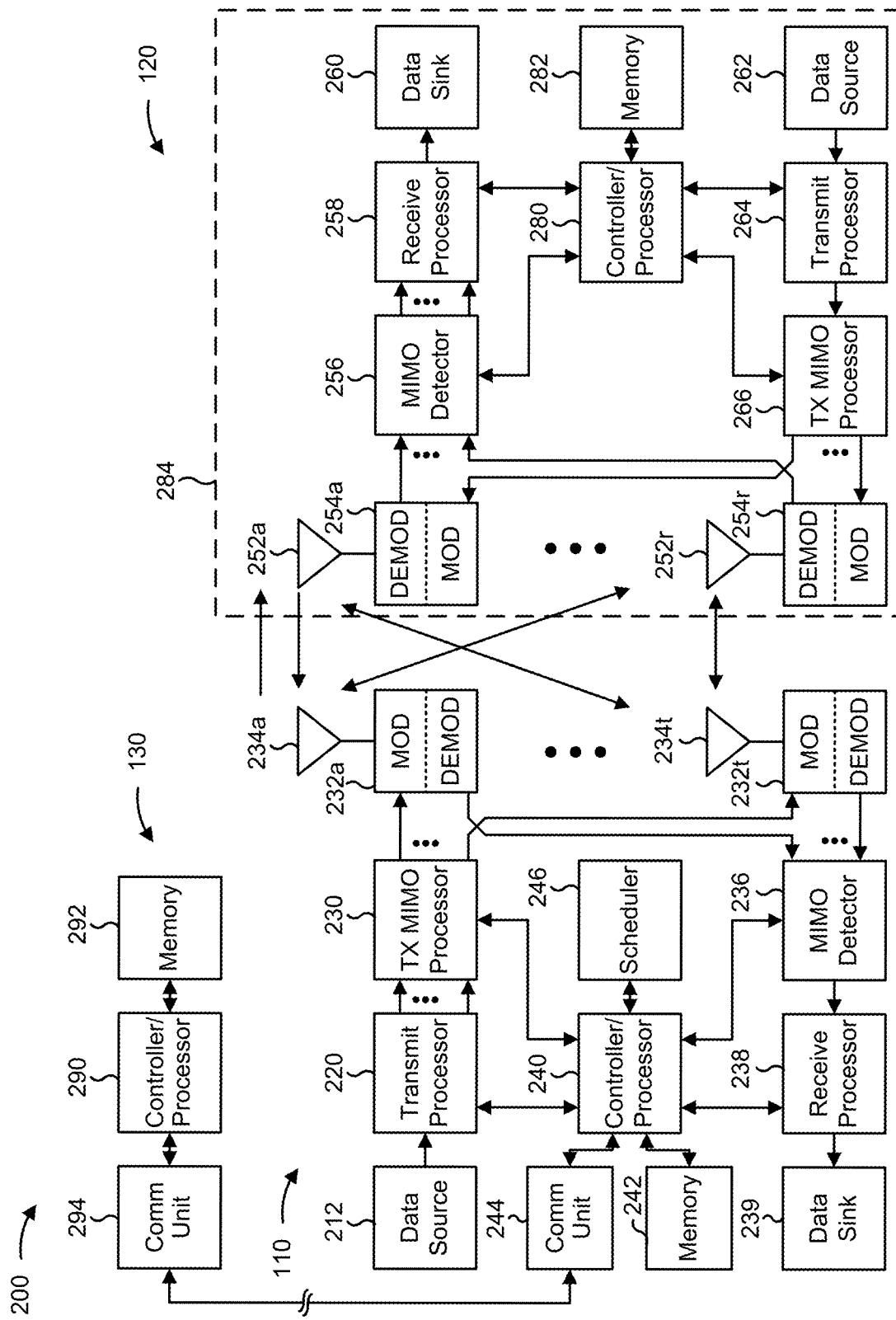
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-9).

Controller/processor 240 of base station 110, controller/processor 280 of UE 120, and/or any other component(s) of FIG. 2 may perform one or more techniques associated with downlink control information (DCI) for frequency domain slot format indication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, memory 282, and/or the like), from a base station, DCI that includes a plurality of frequency domain slot format indications (SFIs), means for communicating (e.g., using antenna 252, DEMOD 254, MIMO detector 256, receive processor 258, controller/processor 280, transmit processor 264, TX MIMO processor 266, MOD 254, and/or the like) with the base station based at least in part on a frequency domain SFI of the plurality of frequency domain SFIs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using controller/processor 240, transmit processor 220, TX MIMO processor 230, MOD 232, antenna 234, memory 242, and/or the like), to a UE, DCI that includes a plurality of frequency domain SFIs, means for communicating (e.g., using controller/processor 240, transmit processor 220, TX MIMO processor 230, MOD 232, antenna 234, DEMOD 232, MIMO detector 236, receive processor 238, and/or the like) with the UE based at least in part on a frequency domain SFI of the plurality of frequency domain SFIs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 320, 340 of full duplex (FD) communication, in accordance with the present disclosure. FD communication may include a contemporaneous uplink and downlink communication. For example, the uplink and downlink communication may at least partially overlap in time.

The example 300 of FIG. 3A includes a UE1 302 and two base stations (e.g., TRPs) 304-1, 304-2, where the UE1 302 is sending a UL transmission to base station 304-1 and is receiving a DL transmission from base station 304-2. In the example 300 of FIG. 3A, FD is enabled for the UE1 302, and FD is not enabled for base stations 304-1, 304-2 (e.g., half duplex (HD) communication is enabled for base stations 304-1, 304-2). Moreover, as shown by reference number 306, the UL transmission to base station 304-1 may self-interfere with the DL transmission from base station 304-2. This may be caused by a variety of factors, such as the transmit power used for the UL transmission (as compared to the DL transmission), radio frequency bleeding, and/or the like.

The example 320 of FIG. 3B includes two UEs, UE1 302-1 and UE2 302-2, and a base station 304, where the UE1 302-1 is receiving a DL transmission from the base station 304 and the UE2 302-2 is transmitting a UL transmission to the base station 304. In the example 320 of FIG. 3B, FD is enabled for the base station 304, and FD is not enabled for UE1 302-1 and UE2 302-2 (e.g., HD communication is enabled for UE1 302-1 and UE2 302-2). Moreover, as shown by reference number 308, the DL transmission from base station 304 to UE1 302-1 may self-interfere with the UL transmission from UE2 302-2 to base station 304.

The example 340 of FIG. 3C includes a UE1 302 and a base station 304, where the UE1 302 is receiving a DL transmission from the base station 304 and the UE1 302 is transmitting a UL transmission to the base station 304. In the example 340 of FIG. 3C, FD is enabled for both the UE1 302 and the base station 304. Moreover, as shown by reference number 310, the UL transmission to base station 304 may self-interfere with the DL transmission from base station 304.

As indicated above, FIGS. 3A-3C are provided as examples. Other examples may differ from what is described with regard to FIGS. 3A-3C.

Figure 4A:
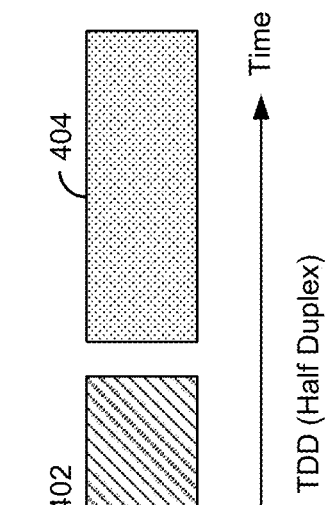
FIGS. 4A-4C are diagrams illustrating various duplexing modes in a radio access network, in accordance with the present disclosure.
Figure 4B:
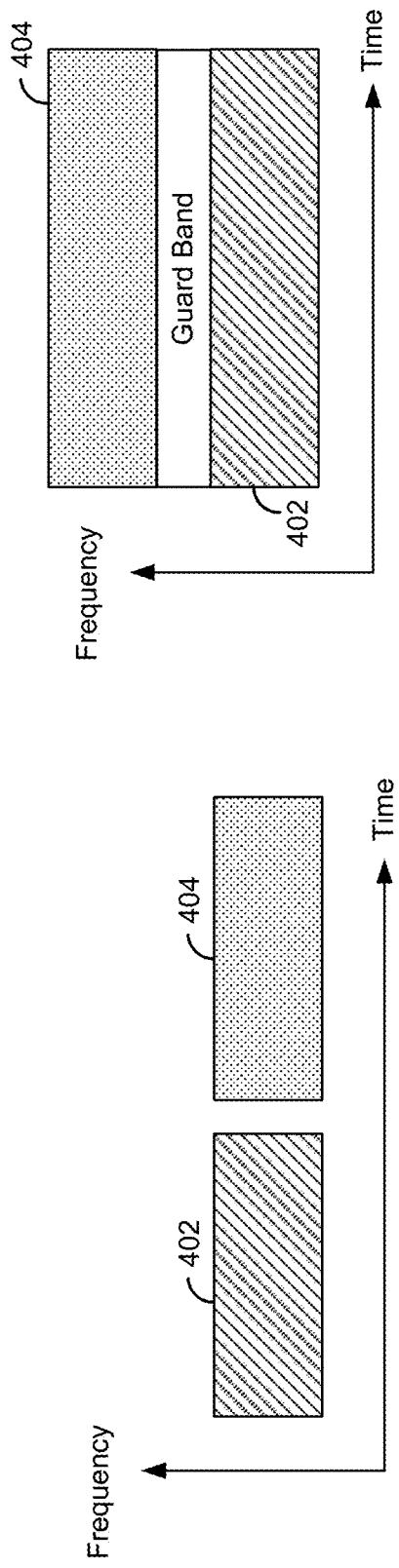
Figure 4C:
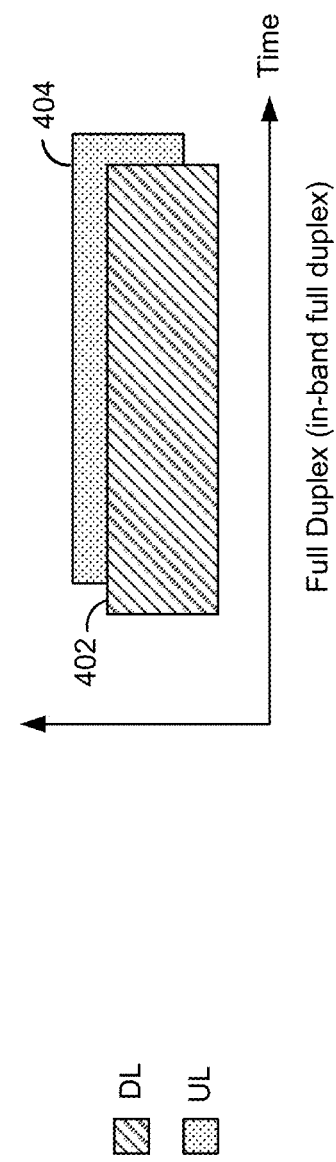

FIGS. 4A-4C are diagrams illustrating various duplexing modes in a radio access network, in accordance with the present disclosure. FIG. 4A depicts a time division duplexing (TDD) mode of communication between a UE and a base station. In TDD, only one endpoint (e.g., one of a UE or a base station) may send information to another endpoint (e.g., the other of the UE or the base station) at a time. For example, in TDD, transmissions in different directions on a given channel are separated from one another using time division multiplexing. That is, at some times the channel is dedicated for transmissions in one direction, while at other times the channel is dedicated for transmissions in the other direction. In some cases, the direction may change rapidly, such as several times per slot. Thus, as illustrated in FIG. 4A, DL communications 402 are separated from UL communications 404 in time.

FIG. 4B depicts a frequency division duplexing (FDD) mode of communication between a UE and a base station. In FDD, both endpoints may simultaneously communicate with one another on different frequencies (e.g., different frequency bands, sets of sub-carriers, resource blocks, and/ or the like). In the FDD mode, as shown in FIG. 4B, transmissions in different directions operate at different carrier frequencies. Thus, as illustrated in FIG. 4B, DL communications 402 are separated from UL communications 404 in frequency, shown as a guard band. In some cases, FDD may be referred to as full duplex because a wireless communication device may be capable of transmitting and receiving at the same time, where transmission uses a first frequency and reception uses a second frequency. Because simultaneous transmission and reception by a device in FDD use different frequencies, this full duplex mode may be referred to as sub-band FDD (or flexible duplex).

FIG. 4C depicts a true FD mode of communication between a UE and a base station. In the true FD mode, as shown in FIG. 4C, transmissions in different directions operate at the same carrier frequency or within overlapping bandwidths. In the example shown in FIG. 4C, DL communications 402 overlap (e.g., partially or fully) UL communications 404 in both time and frequency. Thus, when operating in a true FD mode, the UE and base station are configured for concurrent transmission and reception within an overlapping bandwidth. That is, simultaneous transmission and reception by a device in this mode can use the same frequency. As a result, this FD mode may be referred to as in-band FD.

As indicated above, FIGS. 4A-4C are provided as examples. Other examples may differ from what is described with respect to FIGS. 4A-4C.

Figure 5:
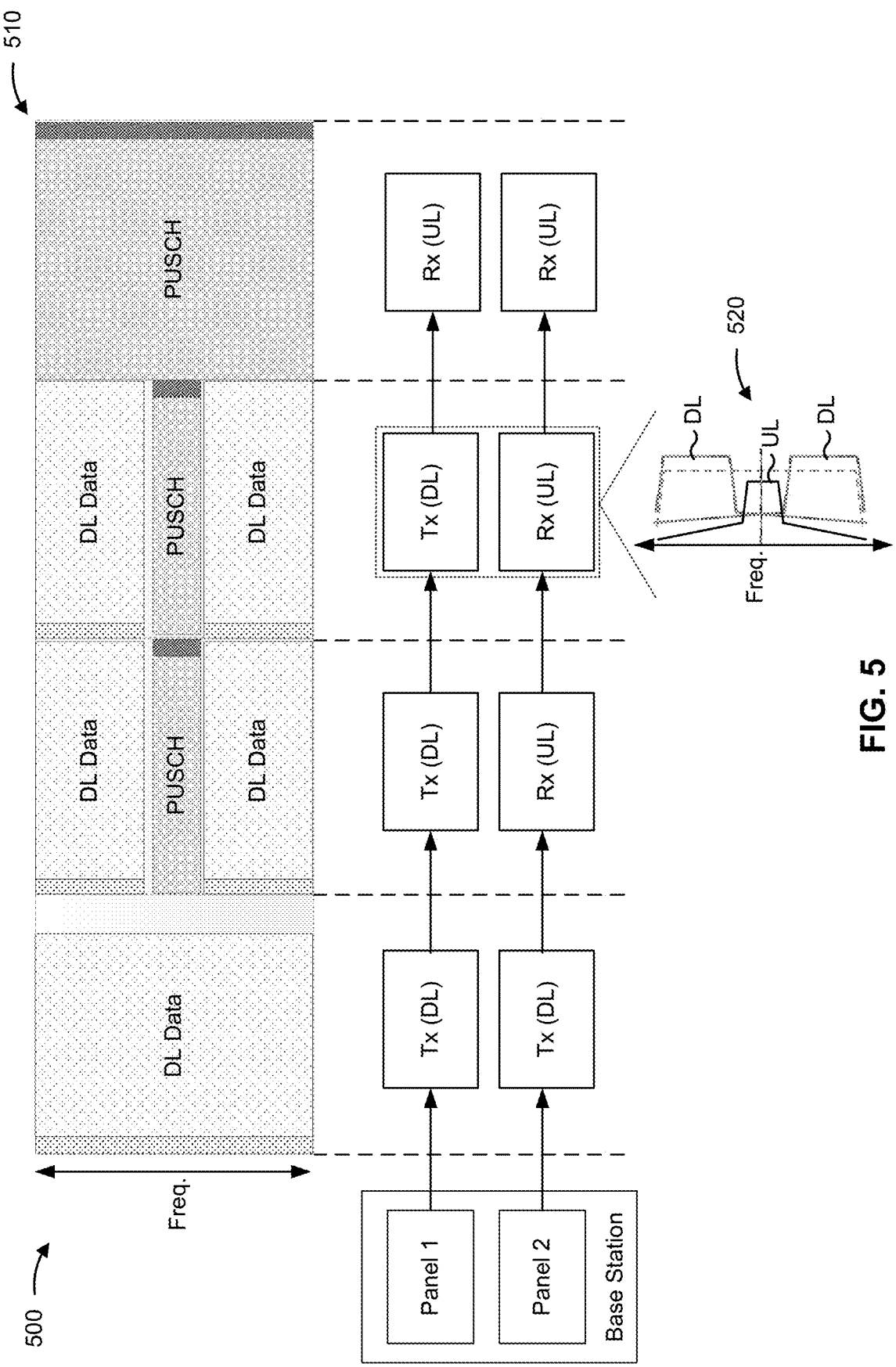
FIG. 5 is a diagram illustrating examples of a frequency division duplexing configuration, in accordance with the present disclosure.

FIG. 5 is a diagram illustrating examples of an FDD configuration, in accordance with the present disclosure. FIG. 5 shows examples of time intervals 510 (e.g., slots, slot groups, subframes, sub-slots, mini-slots, and/or the like). A time interval may include an uplink frequency region, a downlink frequency region, or both an uplink frequency region and a downlink frequency region. Each time interval may be associated with a control region, which is illustrated as a darker-shaded portion of the time interval, and/or a data region, which is shown as DL Data for a downlink frequency region or physical uplink shared channel (PUSCH) for an uplink frequency region. Uplink frequency regions are illustrated using a tighter dotted fill than downlink frequency regions.

An FDD configuration may indicate one or more downlink frequency regions and one or more uplink frequency regions. For example, an FDD configuration may divide an unpaired band (e.g., one or more component carriers of an unpaired band) into uplink frequency regions, downlink frequency regions, and/or other regions (e.g., guard bands and/or the like). An uplink frequency region and a downlink frequency region may or may not be equal in bandwidth. In some aspects, the FDD configuration may identify bandwidth part (BWP) configurations corresponding to the uplink frequency regions and downlink frequency regions. For example, a respective BWP may be configured for each uplink frequency region and each downlink frequency region. FDD may increase throughput and improve spectral efficiency, and may enable the usage of always-on uplink (e.g., for ultra reliable low latency communication (URLLC) control channels).

As further shown in FIG. 5, a base station (or a UE) may include multiple antenna panels (e.g., groups of antenna ports), shown as Panel 1 and Panel 2. The multiple antenna panels may enable simultaneous transmit (Tx) and receive (Rx) operations. Moreover, the multiple antenna panels may provide improved isolation for the simultaneous transmit and receive operations.

In some cases, as shown in FIG. 5, the base station (or a UE) may switch, on a slot-to-slot basis, between FD mode and HD mode. As an example, in an HD downlink time interval (e.g., slot), the base station may transmit a downlink transmission using Panel 1 and Panel 2. In an FD time interval, the base station may transmit a downlink transmission using Panel 1 and receive an uplink transmission using Panel 2. In an HD uplink time interval, the base station may receive an uplink transmission using Panel 1 and Panel 2.

As shown by reference number 520, in an FD mode, downlink communication (e.g., on Panel 1) may use the edges of a frequency band, and uplink communication (e.g., on Panel 2) may use a middle region of the frequency band (e.g., between the edges). However, as shown, frequency bleeding of uplink communication may cause interference with downlink communication (which may be a problem for a UE), and frequency bleeding of downlink communication may cause interference with uplink communication (which may be a problem for a base station).

A base station (or a UE) may perform various techniques for nullifying or cancelling self-interference, such as antenna isolation (using physically separated antennas for transmission or reception, as described above), analog interference cancellation, digital interference cancellation, massive MIMO (M-MIMO) based beamforming nulling for clutter reflection, and sub-band FD to achieve isolation based at least in part on an adjacent channel leakage ratio (ACLR), and/or the like. In sub-band FD, the downlink and the uplink are in different portions of a band or component carrier, as described above. A guard band (GB) may be provided between the uplink and the downlink. Receive weighted overlap and add (WOLA) operations may reduce ACLR leakage to the uplink signal. Analog low pass filters may improve analog-digital converter (ADC) dynamic range.

As indicated above, FIG. 5 is provided as an example. Other examples may differ from what is provided with regard to FIG. 5.

Figure 6:
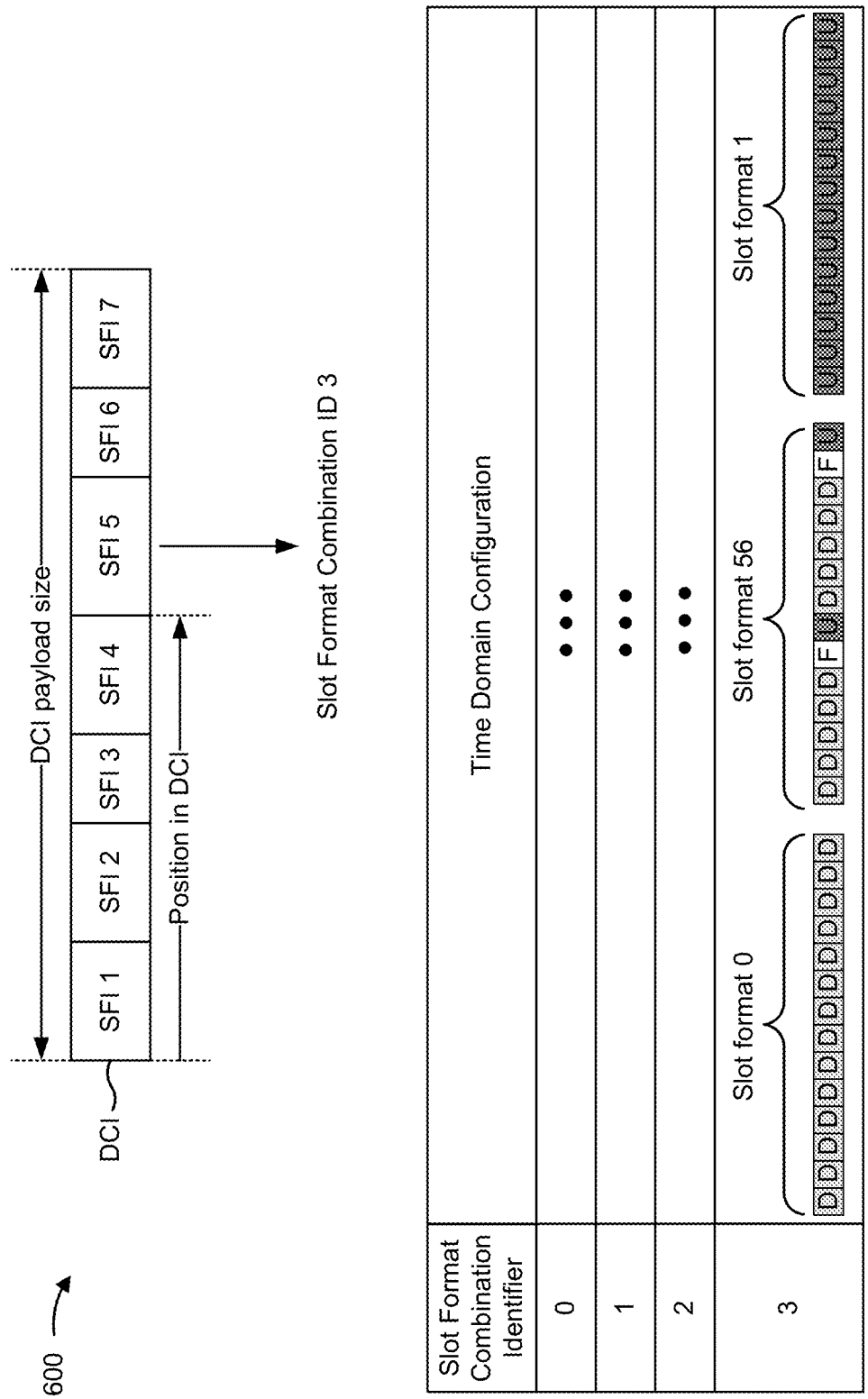
FIG. 6 is a diagram illustrating an example of time domain slot format indication, in accordance with the present disclosure.

FIG. 6 is a diagram illustrating an example of time domain slot format indication, in accordance with the present disclosure. As shown in FIG. 6, a UE may receive DCI (e.g., UE group common DCI, such as in DCI format 2_0) that includes a plurality of time domain slot format indications (SFIs, which may also be referred to as slot format indicators). The UE may also receive (e.g., prior to receiving the DCI) a configuration for a position-in-DCI (e.g., PositionInDCI) value that the UE is to use to determine a time domain SFI from the plurality of time domain SFIs. That is, the UE may use the position-in-DCI value to determine a position in the DCI associated with a time domain SFI that is to be used by the UE 120. For example, as shown in FIG. 6, the position-in-DCI value may indicate that SFI 5 is to be used.

Each time domain SFI may be associated with a respective slot format combination identifier (e.g., SlotFormatCombinationID). For example, SFI 5 may map to slot format combination identifier 3. Moreover, the UE may be configured with a plurality of time domain configurations for one or more slots (or other time intervals), and each slot format combination identifier may map to a respective time domain configuration of the plurality of time domain configurations. For example, as shown in FIG. 6, slot format combination identifier 3 may map to slot format 0, slot format 56, and slot format 1, which indicate time domain configurations for three slots. In some aspects, a time domain configuration for one or more slots may identify symbols that are for uplink (U) communication, downlink (D) communication, or flexible (F) communication (e.g., uplink or downlink).

In some cases, a time domain SFI may indicate a time domain configuration that configures one or more slots for FD communication. However, current wireless networks may lack a mechanism to indicate, in DCI, an FD frequency domain configuration that is to be used for FD slots. Some techniques and apparatuses described herein provide DCI that includes a plurality of frequency domain SFIs that are respectively associated with FD frequency domain configurations. In this way, a UE may determine a frequency domain SFI, of the plurality of frequency domain SFIs, that is to be used for one or more FD slots.

As indicated above, FIG. 6 is provided as an example. Other examples may differ from what is provided with regard to FIG. 6.

Figure 7:
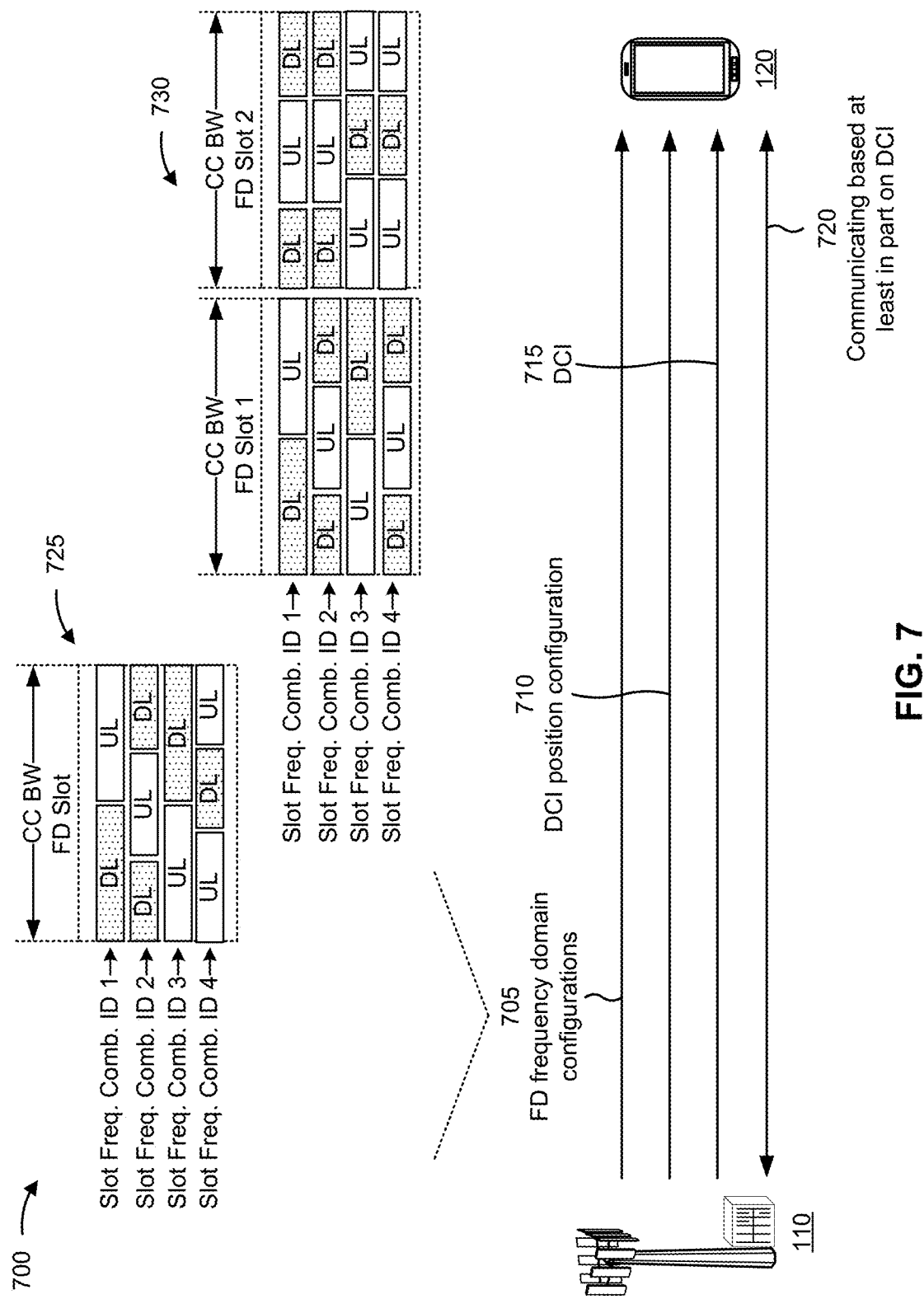
FIG. 7 is a diagram illustrating an example associated with DCI for frequency domain slot format indication, in accordance with the present disclosure.

FIG. 7 is a diagram illustrating an example 700 of DCI for frequency domain slot format indication, in accordance with the present disclosure. As shown in FIG. 7, a base station 110 and a UE 120 may communicate with one another. In some aspects, the UE 120 may be capable of operating in an FD mode (e.g., an FD UE). In some aspects, the UE 120 may not be capable of operating in an FD mode, but may be aware of FD operation, FD slots, and/or the like (e.g., an FD-aware UE). In some aspects, the UE 120 may be capable of operating in an HD-FDD mode, whereby the UE 120 may perform only one of uplink communications or downlink communications in an FD slot.

As shown by reference number 705, the base station 110 may transmit, and the UE 120 may receive, one or more FD frequency domain configurations 725, 730. An FD frequency domain configuration may indicate a frequency domain slot format for one or more FD slots. For example, an FD frequency domain configuration may identify a frequency location of one or more uplink frequency bands and one or more downlink frequency bands (e.g., across a carrier bandwidth, a channel bandwidth, a component carrier (CC) bandwidth (BW), and/or the like) in one or more FD slots. Additionally, an FD frequency domain configuration may identify a frequency location of one or more guard bands between the one or more uplink frequency bands and the one or more downlink frequency bands.

As shown in FIG. 7, each FD frequency domain configuration may be associated with a respective slot frequency combination identifier (e.g., SlotFreqCombinationID). Moreover, each slot frequency combination identifier may be associated with a respective frequency domain SFI, as described below.

As described above, the UE 120 also may receive, from the base station 110, one or more time domain configurations. As described above, each time domain configuration may be associated with a respective slot format combination identifier.

In some aspects, the one or more frequency domain configurations and/or the one or more time domain configurations may be radio resource control (RRC) configured for the UE 120. That is, the base station 110 may transmit, and the UE 120 may receive, the one or more frequency domain configurations and/or the one or more time domain configurations via RRC signaling.

As shown by reference number 710, the base station 110 may transmit, and the UE 120 may receive, a DCI position configuration for DCI that includes frequency domain SFIs (which may be referred to herein as frequency domain DCI). In some aspects, the DCI position configuration may include information that identifies a position-in-DCI value (e.g., FreqpositioninDCI) for frequency domain DCI. The position-in-DCI value identifies a position in DCI that is associated with an SFI that the UE 120 is to use (e.g., identifies which frequency domain SFI, of a plurality of frequency domain SFIs in DCI, that the UE 120 is to follow).

As described above, the UE 120 also may receive, from the base station 110, a DCI position configuration for DCI that includes time domain SFIs (which may be referred to herein as time domain DCI). In some aspects, the DCI position configuration may include information that identifies a position-in-DCI value (e.g., PositionInDCI) for time domain DCI, as described above.

In some aspects, the DCI position configuration for frequency domain DCI and/or the DCI position configuration for time domain DCI is DCI-, medium access control control element (MAC-CE)-, or RRC-configured for the UE 120. That is, the base station 110 may transmit, and the UE 120 may receive, the DCI position configuration for frequency domain DCI and/or the DCI position configuration for time domain DCI via DCI, a MAC-CE, or RRC signaling.

As shown by reference number 715, the base station 110 may transmit, and the UE 120 may receive, DCI. In some aspects, the base station 110 may transmit time domain DCI (e.g., UE group common DCI, such as in DCI format 2_0). The time domain DCI may include a plurality of time domain SFIs. As described above, a time domain SFI may map to a slot format combination identifier that indicates a time domain configuration. In some aspects, the base station 110 may transmit frequency domain DCI (e.g., UE group common DCI, such as in a DCI format referred to herein as DCI format 2_x). The frequency domain DCI may include frequency domain information, such as a plurality of frequency domain SFIs. As described above, a frequency domain SFI may map to a slot frequency combination identifier that indicates a frequency domain configuration.

In some aspects, if the UE 120 is an FD UE or an FD-aware UE, then the UE 120 may monitor for, and receive, both the time domain DCI and the frequency domain DCI. In some aspects, if the UE 120 is operating in an HD mode (e.g., an HD UE), then the UE 120 may monitor for, and receive, only the time domain DCI.

In some aspects, the time domain DCI and the frequency domain DCI may be associated with (e.g., scrambled by) different radio network temporary identifiers (RNTIs). Accordingly, the UE 120 may use a first RNTI to receive the time domain DCI, and use a second RNTI (e.g., SFI-freq-RNTI) to receive the frequency domain DCI.

In some aspects, time domain DCI and frequency domain DCI may be associated with the same periodicity. That is, the UE 120 may monitor for frequency domain DCI at the same periodicity as the periodicity that the UE 120 uses to monitor for time domain DCI. In some aspects, time domain DCI and frequency domain DCI may be associated with different periodicities. That is, the UE 120 may monitor for frequency domain DCI at a different periodicity than the periodicity that the UE 120 uses to monitor for time domain DCI.

In some aspects, time domain DCI and frequency domain DCI may be associated with different physical downlink control channel (PDCCH) monitoring occasions. That is, the UE 120 may use a first set of PDCCH monitoring occasions to monitor for time domain DCI, and use a second set of PDCCH monitoring occasions to monitor for frequency domain DCI. This may be useful, for example, when a frequency domain SFI for the UE 120 is updated less frequently than a time domain SFI for the UE 120.

In some aspects, PDCCH monitoring occasions used for frequency domain DCI may be independent of (e.g., uncorrelated with) PDCCH monitoring occasions used for time domain DCI. For example, the UE 120 may receive separate PDCCH monitoring configurations for time domain DCI and for frequency domain DCI.

In some aspects, PDCCH monitoring occasions used for frequency domain DCI may be offset in time and/or frequency relative to PDCCH monitoring occasions used for time domain DCI. For example, the UE 120 may receive a PDCCH monitoring configuration for time domain DCI, and may determine a PDCCH monitoring configuration for frequency domain DCI using a time offset and/or a frequency offset relative to the PDCCH monitoring configuration for time domain DCI.

In some aspects, PDCCH monitoring occasions used for time domain DCI and for frequency domain DCI may be the same. For example, the UE 120 may monitor for time domain DCI and for frequency domain DCI in the same PDCCH monitoring occasions, according to a PDCCH monitoring configuration for time domain DCI (or a PDCCH monitoring configuration for frequency domain DCI).

In some aspects, the UE 120 may be operating in an HD-FDD mode. In some aspects (e.g., when the UE 120 is operating in the HD-FDD mode), the UE 120 may monitor (e.g., may be configured to monitor) a PDCCH monitoring occasion for frequency domain DCI regardless of whether a time domain SFI, of a time domain DCI previously received by the UE 120, indicates a time domain configuration with an FD slot. In this case, the time domain DCI may indicate (e.g., according to an indicated time domain configuration) slots that are to be used for uplink and/or slots that are to be used for downlink. Moreover, the frequency domain DCI may indicate (e.g., according to an indicated FD frequency domain configuration) a downlink frequency location (e.g., a downlink frequency band location) for the slots that are to be used for downlink and indicate an uplink frequency location (e.g., an uplink frequency band location) for the slots that are to be used for uplink.

In some aspects (e.g., when the UE 120 is operating in the HD-FDD mode), the UE 120 may monitor (e.g., may be configured to monitor) a PDCCH monitoring occasion for frequency domain DCI only if a time domain SFI, of a time domain DCI previously received by the UE 120, indicates a time domain configuration with an FD slot. In this case, the time domain DCI may indicate (e.g., according to an indicated time domain configuration) one or more FD slots, and the UE 120 may determine that the indicated FD slot(s) are to be used for HD-FDD. Moreover, the frequency domain DCI may indicate (e.g., according to a frequency domain configuration) the FD slots (e.g., that are to be used for HD-FDD) that are to be used for uplink communication or for downlink communication.

In some aspects, the UE 120 may decode time domain DCI received by the UE 120, and use the DCI position configuration for time domain DCI, to determine a time domain SFI of the plurality of time domain SFIs included in the time domain DCI. The UE 120 may determine a time domain configuration that is to be used based at least in part on the determined time domain SFI (e.g., the time domain SFI may map to a particular time domain configuration, as described above). In some aspects, the time domain configuration may indicate one or more FD slots.

In some aspects, time domain DCI and frequency domain DCI may have a time offset (e.g., periodicities of time domain DCI and frequency domain DCI may be according to the time offset) that enables decoding of the time domain DCI before frequency domain DCI is received. For example, a time offset between a PDCCH monitoring occasion for time domain DCI and a PDCCH monitoring occasion for frequency domain DCI may be greater than an amount of time needed for decoding the time domain DCI.

In this way, the UE 120 may determine, before a PDCCH monitoring occasion for frequency domain DCI, whether a time domain SFI of the time domain DCI indicates an FD slot, and may monitor the PDCCH monitoring occasion for frequency domain DCI based at least in part on whether the time domain SFI indicates the FD slot. For example, the UE 120 may skip the PDCCH monitoring occasion for frequency domain DCI if a previous time domain SFI does not indicate an FD slot, thereby conserving network resources, UE processing resources, and/or the like. Thus, if a time domain SFI of a time domain DCI does not indicate an FD slot, then the UE 120 may skip PDCCH monitoring occasions for frequency domain DCI until the UE 120 receives a time domain SFI that indicates an FD slot. Alternatively, if the UE 120 successfully decodes a time domain DCI that indicates a time domain SFI indicating an FD slot, then the UE 120 may monitor the following PDCCH monitoring occasion for frequency domain DCI (e.g., in order to determine the frequency domain configuration for the FD slot).

In some aspects, the UE 120 may decode the frequency domain DCI received by the UE 120, and use the DCI position configuration for frequency domain DCI, to determine a frequency domain SFI of the plurality of frequency domain SFIs included in the frequency domain DCI. The UE 120 may determine an FD frequency domain configuration that is to be used based at least in part on the determined frequency domain SFI (e.g., the frequency domain SFI may map to a particular FD frequency domain configuration, as described above). The FD frequency domain configuration may be associated with (e.g., used for) one or more FD slots indicated by the time domain configuration, as described above.

In some aspects, decoding of the frequency domain DCI at the UE 120 may fail. In particular, a time domain SFI may indicate at least one FD slot, but the UE 120 may be unable to determine a frequency domain configuration for the FD slot(s) due to a failure to decode the frequency domain DCI. In some aspects (e.g., when the UE 120 fails to decode the frequency domain DCI), the UE 120 may determine that an FD slot is to be used for HD communication (e.g., the FD slot is to be an HD slot) according to a fixed communication indication (e.g., a fixed communication indication configured for the UE 120). For example, the UE 120 may determine that the FD slot is to be a downlink slot (e.g., all downlink symbols), an uplink slot (e.g., all uplink symbols), or a flexible slot (e.g., all flexible symbols, that can be used for downlink or uplink).

In some aspects (e.g., when the UE 120 fails to decode the frequency domain DCI), the UE 120 may determine that an FD slot is to use a default (e.g., pre-configured) FD frequency domain configuration. For example, the default FD frequency domain configuration may be RRC configured for the UE 120. In some aspects (e.g., when the UE 120 fails to decode the frequency domain DCI), the UE 120 may determine that an FD slot is to use an FD frequency domain configuration indicated by a previous frequency domain DCI received by the UE 120 (e.g., the most-recent frequency domain DCI successfully decoded by the UE 120).

In some aspects, the UE 120 may transmit, and the base station 110 may receive, an indication that decoding of the frequency domain DCI has failed. For example, the UE 120 may transmit the indication in connection with one of the above techniques that may be used when decoding of the frequency domain DCI fails.

As shown by reference number 720, the base station 110 and the UE 120 may communicate based at least in part on the DCI received by the UE 120. As described above, the UE 120 may determine a time domain configuration for one or more slots based at least in part on a time domain SFI indicated in the time domain DCI. In some aspects, the time domain configuration may indicate one or more FD slots. As described above, the UE 120 may determine an FD frequency domain configuration (e.g., locations of one or more uplink frequency bands and one or more downlink frequency bands) for the one or more FD slots based at least in part on a frequency domain SFI indicated in the frequency domain DCI. In this way, DCI may be used to indicate a time domain slot format, which may indicate an FD slot, and a frequency domain slot format that is to be used for the FD slot.

As indicated above, FIG. 7 is provided as an example. Other examples may differ from what is described with respect to FIG. 7.

Figure 8:
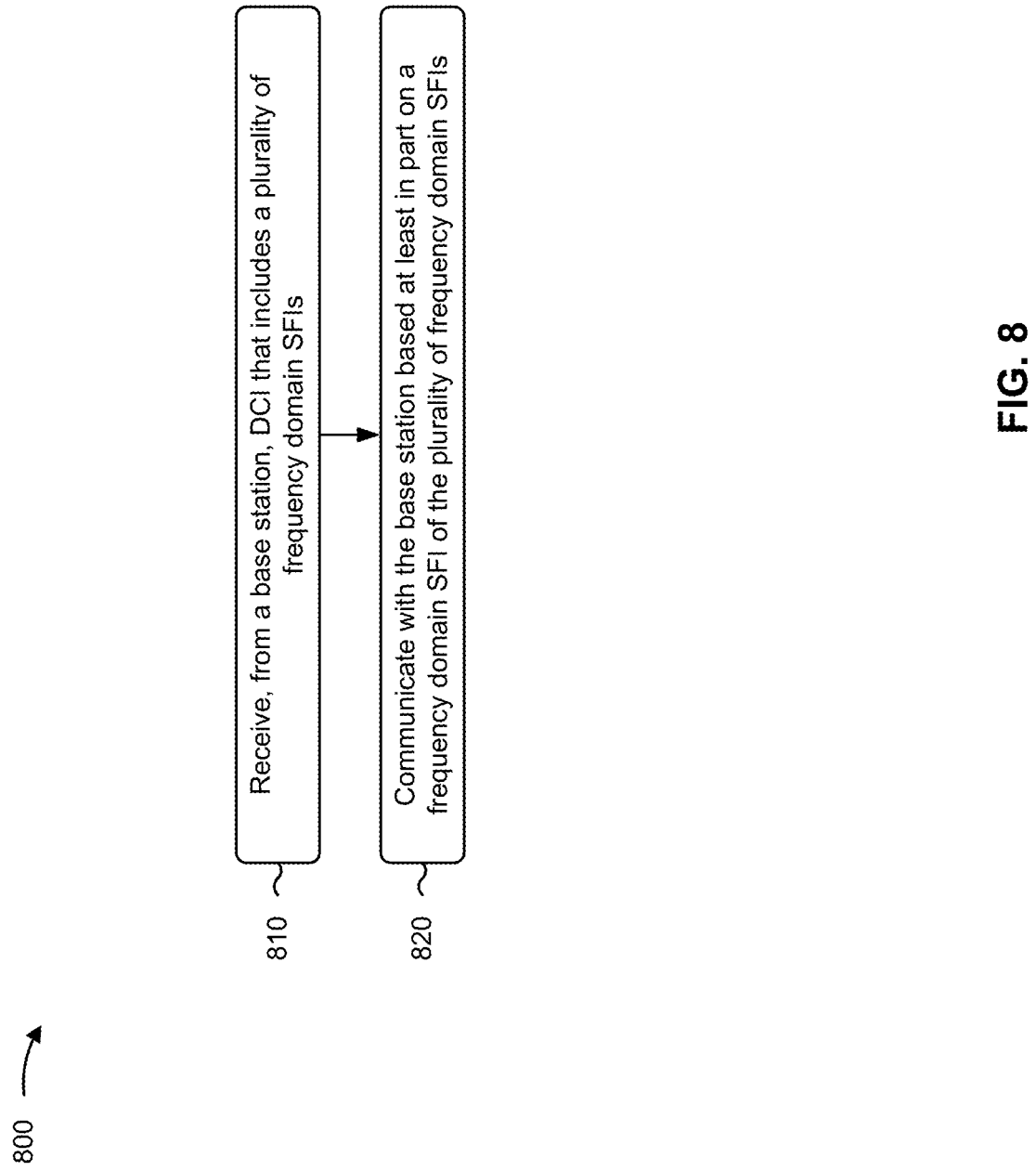
FIGS. 8 and 9 are diagrams illustrating example processes associated with DCI for frequency domain slot format indication, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with DCI for frequency domain slot format indication.

As shown in FIG. 8, in some aspects, process 800 may include receiving, from a base station, DCI that includes a plurality of frequency domain SFIs (block 810). For example, the UE (e.g., using antenna 252, DEMOD 254, MIMO detector 256, receive processor 258, controller/processor 280, and/or the like) may receive, from a base station, DCI that includes a plurality of frequency domain SFIs, as described above, for example, with reference to FIG. 7.

As further shown in FIG. 8, in some aspects, process 800 may include communicating with the base station based at least in part on a frequency domain SFI of the plurality of frequency domain SFIs (block 820). For example, the UE (e.g., using antenna 252, DEMOD 254, MIMO detector 256, receive processor 258, controller/processor 280, transmit processor 264, TX MIMO processor 266, MOD 254, and/or the like) may communicate with the base station based at least in part on a frequency domain SFI of the plurality of frequency domain SFIs, as described above, for example, with reference to FIG. 7.

Process 800 may include additional aspects, such as any single aspect or any combination of aspects described below and/or in connection with one or more other processes described elsewhere herein.

In a first aspect, the frequency domain SFI is to be used for one or more full duplex slots indicated by a time domain SFI.

In a second aspect, alone or in combination with the first aspect, the DCI is associated with a different RNTI than an RNTI associated with another DCI that includes time domain SFIs.

In a third aspect, alone or in combination with one or more of the first and second aspects, process 800 includes receiving information that indicates a position in the DCI associated with the frequency domain SFI of the plurality of frequency domain SFIs.

In a fourth aspect, alone or in combination with one or more of the first through third aspects, the frequency domain SFI indicates a particular full duplex frequency domain configuration, of a plurality of full duplex frequency domain configurations, configured for the UE.

In a fifth aspect, alone or in combination with one or more of the first through fourth aspects, the DCI is associated with a different periodicity than a periodicity associated with another DCI that includes time domain SFIs.

In a sixth aspect, alone or in combination with one or more of the first through fifth aspects, the DCI is associated with a same periodicity as a periodicity associated with another DCI that includes time domain SFIs.

In a seventh aspect, alone or in combination with one or more of the first through sixth aspects, the DCI is associated with a different set of PDCCH monitoring occasions than a set of PDCCH monitoring occasions associated with another DCI that includes time domain SFIs.

In an eighth aspect, alone or in combination with one or more of the first through seventh aspects, the DCI is associated with a set of PDCCH monitoring occasions that are offset in at least one of time or frequency relative to a set of PDCCH monitoring occasions associated with another DCI that includes time domain SFIs.

In a ninth aspect, alone or in combination with one or more of the first through eighth aspects, the DCI is associated with a same set of PDCCH monitoring occasions as a set of PDCCH monitoring occasions associated with another DCI that includes time domain SFIs.

In a tenth aspect, alone or in combination with one or more of the first through ninth aspects, a time offset between a first PDCCH monitoring occasion for another DCI that includes time domain SFIs, and a second PDCCH monitoring occasion for the DCI, is greater than a time for decoding the other DCI.

In an eleventh aspect, alone or in combination with one or more of the first through tenth aspects, process 800 includes receiving another DCI that includes a plurality of time domain SFIs, and communicating with the base station is further based at least in part on a time domain SFI of the plurality of time domain SFIs.

In a twelfth aspect, alone or in combination with one or more of the first through eleventh aspects, the DCI is received in a PDCCH monitoring occasion that is monitored by the UE only when a time domain SFI, previously received by the UE, indicates a full duplex slot.

In a thirteenth aspect, alone or in combination with one or more of the first through twelfth aspects, one or more slots, indicated for full duplex communication by a time domain SFI, are to use a half duplex frequency domain configuration when decoding of the DCI at the UE fails.

In a fourteenth aspect, alone or in combination with one or more of the first through thirteenth aspects, one or more slots, indicated for full duplex communication by a time domain SFI, are to use a default full duplex frequency domain configuration when decoding of the DCI at the UE fails.

In a fifteenth aspect, alone or in combination with one or more of the first through fourteenth aspects, one or more slots, indicated for full duplex communication by a time domain SFI, are to use a full duplex frequency domain configuration indicated by a previous DCI when decoding of the DCI at the UE fails.

In a sixteenth aspect, alone or in combination with one or more of the first through fifteenth aspects, process 800 includes transmitting an indication that decoding of the DCI at the UE has failed.

In a seventeenth aspect, alone or in combination with one or more of the first through sixteenth aspects, when the UE is operating in a half duplex frequency division duplexing mode, the DCI is received in a PDCCH monitoring occasion that is monitored by the UE regardless of whether a time domain SFI, previously received by the UE, indicates a full duplex slot.

In an eighteenth aspect, alone or in combination with one or more of the first through seventeenth aspects, when the UE is operating in a half duplex frequency division duplexing mode, the DCI is received in a PDCCH monitoring occasion that is monitored by the UE only when a time domain SFI, previously received by the UE, indicates a full duplex slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
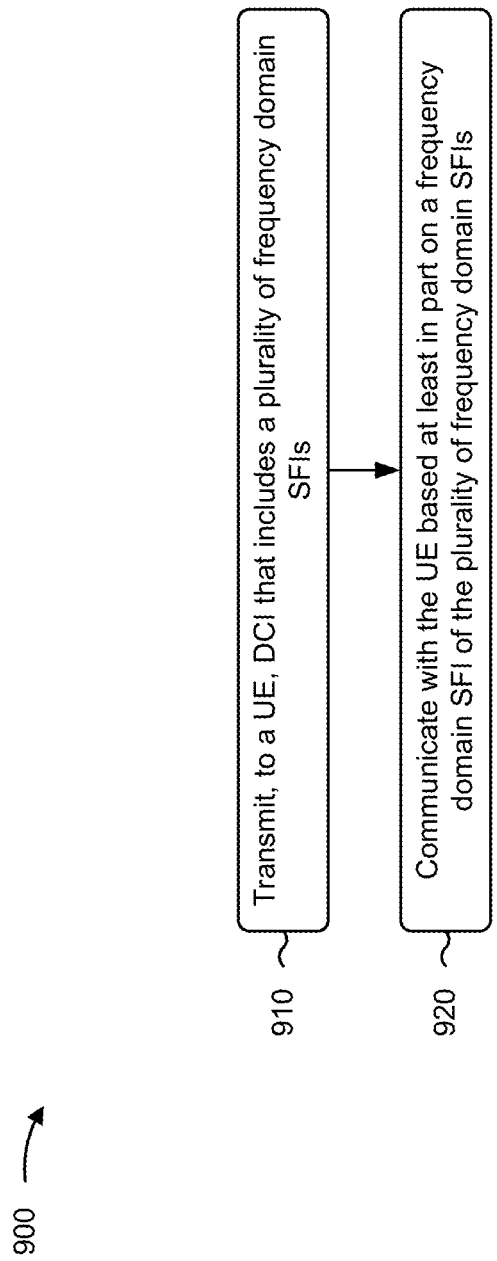

FIG. 9 is a diagram illustrating an example process 900 performed, for example, by a base station, in accordance with the present disclosure. Example process 900 is an example where the base station (e.g., base station 110 and/or the like) performs operations associated with DCI for frequency domain slot format indication.

As shown in FIG. 9, in some aspects, process 900 may include transmitting, to a UE, DCI that includes a plurality of frequency domain SFIs (block 910). For example, the base station (e.g., using controller/processor 240, transmit processor 220, TX MIMO processor 230, MOD 232, antenna 234, and/or the like) may transmit, to a UE, DCI that includes a plurality of frequency domain SFIs, as described above, for example, with reference to FIG. 7.

As further shown in FIG. 9, in some aspects, process 900 may include communicating with the UE based at least in part on a frequency domain SFI of the plurality of frequency domain SFIs (block 920). For example, the base station (e.g., using controller/processor 240, transmit processor 220, TX MIMO processor 230, MOD 232, antenna 234, DEMOD 232, MIMO detector 236, receive processor 238, and/or the like) may communicate with the UE based at least in part on a frequency domain SFI of the plurality of frequency domain SFIs, as described above, for example, with reference to FIG. 7.

Process 900 may include additional aspects, such as any single aspect or any combination of aspects described below and/or in connection with one or more other processes described elsewhere herein.

In a first aspect, the frequency domain SFI is to be used by the UE for one or more full duplex slots indicated by a time domain SFI.

In a second aspect, alone or in combination with the first aspect, the DCI is associated with a different RNTI than an RNTI associated with another DCI that includes time domain SFIs.

In a third aspect, alone or in combination with one or more of the first and second aspects, process 900 includes transmitting information that indicates a position in the DCI associated with the frequency domain SFI of the plurality of frequency domain SFIs.

In a fourth aspect, alone or in combination with one or more of the first through third aspects, the frequency domain SFI indicates a particular full duplex frequency domain configuration, of a plurality of full duplex frequency domain configurations, configured for the UE.

In a fifth aspect, alone or in combination with one or more of the first through fourth aspects, the DCI is associated with a different periodicity than a periodicity associated with another DCI that includes time domain SFIs.

In a sixth aspect, alone or in combination with one or more of the first through fifth aspects, the DCI is associated with a same periodicity as a periodicity associated with another DCI that includes time domain SFIs.

In a seventh aspect, alone or in combination with one or more of the first through sixth aspects, the DCI is associated with a different set of PDCCH monitoring occasions than a set of PDCCH monitoring occasions associated with another DCI that includes time domain SFIs.

In an eighth aspect, alone or in combination with one or more of the first through seventh aspects, the DCI is associated with a set of PDCCH monitoring occasions that are offset in at least one of time or frequency relative to a set of PDCCH monitoring occasions associated with another DCI that includes time domain SFIs.

In a ninth aspect, alone or in combination with one or more of the first through eighth aspects, the DCI is associated with a same set of PDCCH monitoring occasions as a set of PDCCH monitoring occasions associated with another DCI that includes time domain SFIs.

In a tenth aspect, alone or in combination with one or more of the first through ninth aspects, a time offset between a first PDCCH monitoring occasion for another DCI that includes time domain SFIs, and a second PDCCH monitoring occasion for the DCI, is greater than a time for decoding the other DCI.

In an eleventh aspect, alone or in combination with one or more of the first through tenth aspects, process 900 includes transmitting another DCI that includes a plurality of time domain SFIs, and communicating with the UE is further based at least in part on a time domain SFI of the plurality of time domain SFIs.

In a twelfth aspect, alone or in combination with one or more of the first through eleventh aspects, the DCI is transmitted in a PDCCH monitoring occasion that is monitored by the UE only when a time domain SFI, previously received by the UE, indicates a full duplex slot.

In a thirteenth aspect, alone or in combination with one or more of the first through twelfth aspects, one or more slots, indicated for full duplex communication by a time domain SFI, are to use a half duplex frequency domain configuration when decoding of the DCI at the UE fails.

In a fourteenth aspect, alone or in combination with one or more of the first through thirteenth aspects, one or more slots, indicated for full duplex communication by a time domain SFI, are to use a default full duplex frequency domain configuration when decoding of the DCI at the UE fails.

In a fifteenth aspect, alone or in combination with one or more of the first through fourteenth aspects, one or more slots, indicated for full duplex communication by a time domain SFI, are to use a full duplex frequency domain configuration indicated by a previous DCI when decoding of the DCI at the UE fails.

In a sixteenth aspect, alone or in combination with one or more of the first through fifteenth aspects, process 900 includes receiving an indication that decoding of the DCI at the UE has failed.

In a seventeenth aspect, alone or in combination with one or more of the first through sixteenth aspects, when the UE is operating in a half duplex frequency division duplexing mode, the DCI is transmitted in a PDCCH monitoring occasion that is monitored by the UE regardless of whether a time domain SFI, previously received by the UE, indicates a full duplex slot.

In an eighteenth aspect, alone or in combination with one or more of the first through seventeenth aspects, when the UE is operating in a half duplex frequency division duplexing mode, the DCI is transmitted in a PDCCH monitoring occasion that is monitored by the UE only when a time domain SFI, previously received by the UE, indicates a full duplex slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving, from a base station, downlink control information (DCI) that includes a plurality of frequency domain slot format indications (SFIs); and communicating with the base station based at least in part on a frequency domain SFI of the plurality of frequency domain SFIs.

Aspect 2: The method of Aspect 1, wherein the frequency domain SFI is to be used for one or more full duplex slots indicated by a time domain SFI.

Aspect 3: The method of any of Aspects 1-2, wherein the DCI is associated with a different radio network temporary identifier (RNTI) than an RNTI associated with another DCI that includes time domain SFIs.

Aspect 4: The method of any of Aspects 1-3, further comprising: receiving information that indicates a position in the DCI associated with the frequency domain SFI of the plurality of frequency domain SFIs.

Aspect 5: The method of any of Aspects 1-4, wherein the frequency domain SFI indicates a particular full duplex frequency domain configuration, of a plurality of full duplex frequency domain configurations, configured for the UE.

Aspect 6: The method of any of Aspects 1-5, wherein the DCI is associated with a different periodicity than a periodicity associated with another DCI that includes time domain SFIs.

Aspect 7: The method of any of Aspects 1-5, wherein the DCI is associated with a same periodicity as a periodicity associated with another DCI that includes time domain SFIs.

Aspect 8: The method of any of Aspects 1-7, wherein the DCI is associated with a different set of physical downlink control channel (PDCCH) monitoring occasions than a set of PDCCH monitoring occasions associated with another DCI that includes time domain SFIs.

Aspect 9: The method of any of Aspects 1-8, wherein the DCI is associated with a set of physical downlink control channel (PDCCH) monitoring occasions that are offset in at least one of time or frequency relative to a set of PDCCH monitoring occasions associated with another DCI that includes time domain SFIs.

Aspect 10: The method of any of Aspects 1-7, wherein the DCI is associated with a same set of physical downlink control channel (PDCCH) monitoring occasions as a set of PDCCH monitoring occasions associated with another DCI that includes time domain SFIs.

Aspect 11: The method of any of Aspects 1-9, wherein a time offset between a first physical downlink control channel (PDCCH) monitoring occasion for another DCI that includes time domain SFIs, and a second PDCCH monitoring occasion for the DCI, is greater than a time for decoding the other DCI.

Aspect 12: The method of any of Aspects 1-11, further comprising: receiving another DCI that includes a plurality of time domain SFIs, wherein communicating with the base station is further based at least in part on a time domain SFI of the plurality of time domain SFIs.

Aspect 13: The method of any of Aspects 1-12, wherein the DCI is received in a physical downlink control channel monitoring occasion that is monitored by the UE only when a time domain SFI, previously received by the UE, indicates a full duplex slot.

Aspect 14: The method of any of Aspects 1-13, wherein one or more slots, indicated for full duplex communication by a time domain SFI, are to use a half duplex frequency domain configuration when decoding of the DCI at the UE fails.

Aspect 15: The method of any of Aspects 1-13, wherein one or more slots, indicated for full duplex communication by a time domain SFI, are to use a default full duplex frequency domain configuration when decoding of the DCI at the UE fails.

Aspect 16: The method of any of Aspects 1-13, wherein one or more slots, indicated for full duplex communication by a time domain SFI, are to use a full duplex frequency domain configuration indicated by a previous DCI when decoding of the DCI at the UE fails.

Aspect 17: The method of any of Aspects 1-16, further comprising: transmitting an indication that decoding of the DCI at the UE has failed.

Aspect 18: The method of any of Aspects 1-17, wherein, when the UE is operating in a half duplex frequency division duplexing mode, the DCI is received in a physical downlink control channel monitoring occasion that is monitored by the UE regardless of whether a time domain SFI, previously received by the UE, indicates a full duplex slot.

Aspect 19: The method of any of Aspects 1-17, wherein, when the UE is operating in a half duplex frequency division duplexing mode, the DCI is received in a physical downlink control channel monitoring occasion that is monitored by the UE only when a time domain SFI, previously received by the UE, indicates a full duplex slot.

Aspect 20: A method of wireless communication performed by a base station, comprising: transmitting, to a user equipment (UE), downlink control information (DCI) that includes a plurality of frequency domain slot format indications (SFIs); and communicating with the UE based at least in part on a frequency domain SFI of the plurality of frequency domain SFIs.

Aspect 21: The method of Aspect 20, wherein the frequency domain SFI is to be used by the UE for one or more full duplex slots indicated by a time domain SFI.

Aspect 22: The method of any of Aspects 20-21, wherein the DCI is associated with a different radio network temporary identifier (RNTI) than an RNTI associated with another DCI that includes time domain SFIs.

Aspect 23: The method of any of Aspects 20-22, further comprising: transmitting information that indicates a position in the DCI associated with the frequency domain SFI of the plurality of frequency domain SFIs.

Aspect 24: The method of any of Aspects 20-23, wherein the frequency domain SFI indicates a particular full duplex frequency domain configuration, of a plurality of full duplex frequency domain configurations, configured for the UE.

Aspect 25: The method of any of Aspects 20-24, wherein the DCI is associated with a different periodicity than a periodicity associated with another DCI that includes time domain SFIs.

Aspect 26: The method of any of Aspects 20-24, wherein the DCI is associated with a same periodicity as a periodicity associated with another DCI that includes time domain SFIs.

Aspect 27: The method of any of Aspects 20-26, wherein the DCI is associated with a different set of physical downlink control channel (PDCCH) monitoring occasions than a set of PDCCH monitoring occasions associated with another DCI that includes time domain SFIs.

Aspect 28: The method of any of Aspects 20-27, wherein the DCI is associated with a set of physical downlink control channel (PDCCH) monitoring occasions that are offset in at least one of time or frequency relative to a set of PDCCH monitoring occasions associated with another DCI that includes time domain SFIs.

Aspect 29: The method of any of Aspects 20-26, wherein the DCI is associated with a same set of physical downlink control channel (PDCCH) monitoring occasions as a set of PDCCH monitoring occasions associated with another DCI that includes time domain SFIs.

Aspect 30: The method of any of Aspects 20-28, wherein a time offset between a first physical downlink control channel (PDCCH) monitoring occasion for another DCI that includes time domain SFIs, and a second PDCCH monitoring occasion for the DCI, is greater than a time for decoding the other DCI.

Aspect 31: The method of any of Aspects 20-30, further comprising: transmitting another DCI that includes a plurality of time domain SFIs, wherein communicating with the UE is further based at least in part on a time domain SFI of the plurality of time domain SFIs.

Aspect 32: The method of any of Aspects 20-31, wherein the DCI is transmitted in a physical downlink control channel monitoring occasion that is monitored by the UE only when a time domain SFI, previously received by the UE, indicates a full duplex slot.

Aspect 33: The method of any of Aspects 20-32, wherein one or more slots, indicated for full duplex communication by a time domain SFI, are to use a half duplex frequency domain configuration when decoding of the DCI at the UE fails.

Aspect 34: The method of any of Aspects 20-32, wherein one or more slots, indicated for full duplex communication by a time domain SFI, are to use a default full duplex frequency domain configuration when decoding of the DCI at the UE fails.

Aspect 35: The method of any of Aspects 20-32, wherein one or more slots, indicated for full duplex communication by a time domain SFI, are to use a full duplex frequency domain configuration indicated by a previous DCI when decoding of the DCI at the UE fails.

Aspect 36: The method of any of Aspects 20-35, further comprising: receiving an indication that decoding of the DCI at the UE has failed.

Aspect 37: The method of any of Aspects 20-36, wherein, when the UE is operating in a half duplex frequency division duplexing mode, the DCI is transmitted in a physical downlink control channel monitoring occasion that is monitored by the UE regardless of whether a time domain SFI, previously received by the UE, indicates a full duplex slot.

Aspect 38: The method of any of Aspects 20-36, wherein, when the UE is operating in a half duplex frequency division duplexing mode, the DCI is transmitted in a physical downlink control channel monitoring occasion that is monitored by the UE only when a time domain SFI, previously received by the UE, indicates a full duplex slot.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the memory and the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the memory and the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory;
   a transceiver; and
   one or more processors, coupled to the memory, configured to:
      receive, from a base station, via the transceiver, a set of frequency domain configurations, wherein the set of frequency domain configurations identify one or more frequency band locations corresponding to one or more full duplex slots, and wherein the set of frequency domain configurations is associated with at least one frequency domain slot format indication (SFI);
      receive, from the base station, via the transceiver, downlink control information (DCI) that includes the at least one frequency domain SFI; and
      communicate, via the transceiver, with the base station based at least in part on the one or more frequency band locations associated with the at least one frequency domain SFI.

2. The UE of claim 1, wherein the at least one frequency domain SFI is to be used for the one or more full duplex slots, and wherein the one or more full duplex slots are indicated by a time domain SFI.

3. The UE of claim 1, wherein the at least one frequency domain SFI indicates a particular full duplex frequency domain configuration, of the set of frequency domain configurations, configured for the UE.

4. The UE of claim 1, wherein the DCI is associated with a different periodicity than a periodicity associated with another DCI that includes time domain SFIs.

5. The UE of claim 1, wherein the DCI is associated with a same periodicity as a periodicity associated with another DCI that includes time domain SFIs.

6. The UE of claim 1, wherein the DCI is received in a physical downlink control channel monitoring occasion that is monitored by the UE only when a time domain SFI, previously received by the UE, indicates a full duplex slot.

7. The UE of claim 1, wherein the one or more full duplex slots, indicated for full duplex communication by a time domain SFI, are to use a half duplex frequency domain configuration when decoding of the DCI at the UE fails.

8. The UE of claim 1, wherein the one or more full duplex slots, indicated for full duplex communication by a time domain SFI, are to use a default full duplex frequency domain configuration when decoding of the DCI at the UE fails.

9. The UE of claim 1, wherein the one or more full duplex slots, indicated for full duplex communication by a time domain SFI, are to use a full duplex frequency domain configuration indicated by a previous DCI when decoding of the DCI at the UE fails.

10. The UE of claim 1, wherein the one or more processors are further configured to:
    transmit, via the transceiver, an indication that decoding of the DCI at the UE has failed.

11. The UE of claim 1, wherein, when the UE is operating in a half duplex frequency division duplexing mode, the DCI is received in a physical downlink control channel monitoring occasion that is monitored by the UE regardless of whether a time domain SFI, previously received by the UE, indicates a full duplex slot.

12. The UE of claim 1, wherein, when the UE is operating in a half duplex frequency division duplexing mode, the DCI is received in a physical downlink control channel monitoring occasion that is monitored by the UE only when a time domain SFI, previously received by the UE, indicates a full duplex slot.

13. A base station for wireless communication, comprising:
a memory;
a transceiver; and
one or more processors, coupled to the memory, configured to:
transmit, to a user equipment (UE), via the transceiver, a set of frequency domain configurations, wherein the set of frequency domain configurations identify one or more frequency band locations corresponding to one or more full duplex slots, and wherein the set of frequency domain configurations is associated with at least one frequency domain slot format indication (SFI);
transmit, to the UE, via the transceiver, downlink control information (DCI) that includes the at least one frequency domain SFI; and
communicate, via the transceiver, with the UE based at least in part on the one or more frequency band locations associated with the at least one frequency domain SFI.

14. The base station of claim 13, wherein the frequency domain SFI is to be used by the UE for the one or more full duplex slots, and wherein the one or more full duplex slots are indicated by a time domain SFI.

15. The base station of claim 13, wherein the frequency domain SFI indicates a particular full duplex frequency domain configuration, of the set of frequency domain configurations, configured for the UE.

16. The base station of claim 13, wherein the DCI is associated with a different periodicity than a periodicity associated with another DCI that includes time domain SFIs.

17. The base station of claim 13, wherein the DCI is associated with a same periodicity as a periodicity associated with another DCI that includes time domain SFIs.

18. The base station of claim 13, wherein the DCI is transmitted in a physical downlink control channel monitoring occasion that is monitored by the UE only when a time domain SFI, previously received by the UE, indicates a full duplex slot.

19. The base station of claim 13, wherein the one or more full duplex slots, indicated for full duplex communication by a time domain SFI, are to use a half duplex frequency domain configuration when decoding of the DCI at the UE fails.

20. The base station of claim 13, wherein the one or more full duplex slots, indicated for full duplex communication by a time domain SFI, are to use a default full duplex frequency domain configuration when decoding of the DCI at the UE fails.

21. The base station of claim 13, wherein the one or more full duplex slots, indicated for full duplex communication by a time domain SFI, are to use a full duplex frequency domain configuration indicated by a previous DCI when decoding of the DCI at the UE fails.

22. The base station of claim 13, wherein the one or more processors are further configured to:
receive, via the transceiver, an indication that decoding of the DCI at the UE has failed.

23. The base station of claim 13, wherein, when the UE is operating in a half duplex frequency division duplexing mode, the DCI is transmitted in a physical downlink control channel monitoring occasion that is monitored by the UE regardless of whether a time domain SFI, previously received by the UE, indicates a full duplex slot.

24. The base station of claim 13, wherein, when the UE is operating in a half duplex frequency division duplexing mode, the DCI is transmitted in a physical downlink control channel monitoring occasion that is monitored by the UE only when a time domain SFI, previously received by the UE, indicates a full duplex slot.

25. A method of wireless communication performed by a user equipment (UE), comprising:
receiving, from a base station, a set of frequency domain configurations, wherein the set of frequency domain configurations identify one or more frequency band locations corresponding to one or more full duplex slots, and wherein the one or more frequency domain configurations is associated with at least one frequency domain slot format indication (SFI);
receiving, from the base station, downlink control information (DCI) the at least one frequency domain SFI; and
communicating with the base station based at least in part on the one or more frequency band locations associated with the at least one frequency domain SFI.

26. The method of claim 25, wherein the frequency domain SFI is to be used for the one or more full duplex slots, and wherein the one or more full duplex slots are indicated by a time domain SFI.

27. The method of claim 25, wherein the frequency domain SFI indicates a particular full duplex frequency domain configuration, of the set of frequency domain configurations, configured for the UE.

28. A method of wireless communication performed by a base station, comprising:
transmitting, to a user equipment (UE), a set of frequency domain configurations, wherein the set of frequency domain configurations identify one or more frequency band locations corresponding to one or more full duplex slots, and wherein the set of frequency domain configurations is associated with at least one frequency domain slot format indication (SFI);
transmitting, to the UE, downlink control information (DCI) that includes the at least one frequency domain SFI; and
communicating with the UE based at least in part on one or more frequency band locations associated with the frequency domain SFI.

29. The method of claim 28, wherein the frequency domain SFI is to be used by the UE for the one or more full duplex slots, and wherein the one or more full duplex slots are indicated by a time domain SFI.

30. The method of claim 28, wherein the frequency domain SFI indicates a particular full duplex frequency domain configuration, of the set of frequency domain configurations, configured for the UE.

* * * * *